United States Patent
Taylor et al.

(10) Patent No.: US 12,430,620 B2
(45) Date of Patent: Sep. 30, 2025

(54) SYSTEMS AND METHODS FOR PERFORMING AND TRACKING ASSET INSPECTIONS

(71) Applicant: Walmart Apollo, LLC, Bentonvile, AR (US)

(72) Inventors: Robert James Taylor, Rogers, AR (US); Matthew David Alexander, Rogers, AR (US); Shawn M. Hodge, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 23 days.

(21) Appl. No.: 18/161,651

(22) Filed: Jan. 30, 2023

(65) Prior Publication Data

US 2023/0177473 A1    Jun. 8, 2023

Related U.S. Application Data

(63) Continuation of application No. 16/020,151, filed on Jun. 27, 2018, now Pat. No. 11,610,183.
(Continued)

(51) Int. Cl.
*G06Q 10/20* (2023.01)
*G06F 3/0482* (2013.01)
(Continued)

(52) U.S. Cl.
CPC ........... *G06Q 10/20* (2013.01); *G06F 3/0482* (2013.01); *G06Q 10/06393* (2013.01);
(Continued)

(58) Field of Classification Search
CPC .. G06Q 10/20; G06Q 10/06; G06Q 10/06311; G06Q 10/063114;
(Continued)

(56) References Cited

U.S. PATENT DOCUMENTS 4,636,950 A    1/1987  Caswell et al.
4,887,208 A   12/1989  Schneider et al.
(Continued)

FOREIGN PATENT DOCUMENTS

KR      20140108444 A    9/2014
WO   WO 2013021158 A2    2/2013
(Continued)

OTHER PUBLICATIONS

Vrunda Negandhi, Lakshminarayanan Sreenivasan, Randy Giffen, Mohit Sewak, Amaresh Rajasekharan, "IBM Predictive Maintenance and Quality 2.0 Technical Overview", Jun. 2015, IBM, pp. 1-192 (Year: 2015).*
(Continued)

*Primary Examiner* — Sarah M Monfeldt
*Assistant Examiner* — Michael J. Monaghan
(74) *Attorney, Agent, or Firm* — Foley IP Law, PLLC

(57) ABSTRACT

A facility readiness inspection system and method are disclosed. Embodiments comprise an asset database comprising inspection task definition for assets. An inspection coordination application program interface (API) can create at least one periodic inspection task list. Each periodic inspection task list can include a number of tasks and assets, chosen based on the total time allotted for completion of the periodic inspection task list and the complexity of the inspection task definitions of each physical asset. Mobile electronic device can be configured to present the periodic inspection task list as a series of discrete tasks and to receive task list response data in response to each discrete task. Response data can be compared to benchmarks and standards, and issues can be escalated to external systems. An analytics engine can automatically produce inspection compliance documentation for each of the physical assets related to the periodic inspection task list.

20 Claims, 9 Drawing Sheets

Related U.S. Application Data

(60) Provisional application No. 62/526,758, filed on Jun. 29, 2017.

(51) Int. Cl.
*G06Q 10/0639* (2023.01)
*G06Q 10/08* (2024.01)
*H04W 4/02* (2018.01)
*H04W 4/33* (2018.01)
*H04W 4/35* (2018.01)
*H04W 4/38* (2018.01)

(52) U.S. Cl.
CPC .............. *H04W 4/02* (2013.01); *H04W 4/33* (2018.02); *H04W 4/38* (2018.02); *G06Q 10/08* (2013.01); *H04W 4/35* (2018.02)

(58) Field of Classification Search
CPC ................ G06Q 10/087; G06Q 10/10; G06Q 10/06316; G06Q 10/0631; G06Q 10/06315; G06Q 10/08; G06Q 30/018; G06Q 10/063116; G06Q 10/06313; G06Q 10/0633; G06Q 10/06395; G06Q 50/28; G06Q 10/00; G06Q 10/04; G06Q 10/063112; G06Q 10/06393; G06Q 10/103; G06Q 10/1097; G06Q 10/06312; G06Q 10/063118; G06Q 10/06398; G06Q 10/047; H04W 4/02; H04W 4/023; H04W 4/029; G06F 3/0482; G06F 11/008; G05B 19/41865; G05B 23/0283; G05B 23/0294
See application file for complete search history.

(56) References Cited

U.S. PATENT DOCUMENTS

| | | |
|---|---|---|
| 5,319,544 A | 6/1994 | Schmerer |
| 6,564,226 B1 | 5/2003 | Dickson |
| 6,681,990 B2 | 1/2004 | Vogler |
| 7,206,753 B2 | 4/2007 | Bancroft |
| 7,693,757 B2 | 4/2010 | Zimmerman |
| 8,027,750 B2 | 9/2011 | Orita |
| 8,321,303 B1 | 11/2012 | Krishnamurthy |
| 8,429,004 B2 | 4/2013 | Hamilton |
| 8,438,084 B1 | 5/2013 | Tesler et al. |
| 8,515,831 B2 | 8/2013 | Vatti |
| 8,982,155 B2 | 3/2015 | Fukushima |
| 9,026,563 B2 | 5/2015 | Juillard |
| 9,058,215 B2 | 6/2015 | Colligan |
| 9,120,622 B1 | 9/2015 | Elazary |
| 9,224,231 B2 | 12/2015 | Peddi |
| 9,280,757 B2 | 3/2016 | Parpia |
| 9,324,171 B2 | 4/2016 | Hicks |
| 9,672,486 B1 | 6/2017 | Turpin |
| 2002/0007300 A1 | 1/2002 | Slatter |
| 2002/0165790 A1 | 11/2002 | Bancroft |
| 2003/0050764 A1 | 3/2003 | Manegold |
| 2003/0050936 A1 | 3/2003 | Wainwright |
| 2003/0115088 A1 | 6/2003 | Thompson |
| 2004/0117046 A1 | 6/2004 | Colle |
| 2007/0129914 A1 | 6/2007 | Yano |
| 2007/0203811 A1 | 8/2007 | Hoopes |
| 2008/0201388 A1* | 8/2008 | Wood ...................... G06Q 10/06 707/999.203 |
| 2008/0306787 A1 | 12/2008 | Hamilton |
| 2009/0007097 A1 | 1/2009 | Hinton |
| 2009/0099898 A1* | 4/2009 | Ehrman ................. G06Q 10/06 705/7.15 |
| 2009/0132331 A1* | 5/2009 | Cartledge .............. G06Q 10/10 705/7.27 |
| 2009/0199192 A1* | 8/2009 | Laithwaite ......... G06Q 10/109 718/104 |
| 2009/0271243 A1* | 10/2009 | Sholl .................... G06Q 30/018 715/708 |
| 2010/0064242 A1 | 3/2010 | Tays |
| 2010/0287025 A1* | 11/2010 | Fletcher ................. G06Q 10/06 705/7.15 |
| 2010/0312604 A1* | 12/2010 | Mitchell .......... G06Q 10/06311 705/7.18 |
| 2010/0332562 A1* | 12/2010 | Emigh ................ G06F 3/04842 715/764 |
| 2011/0112943 A1* | 5/2011 | Dietz ................... G06Q 10/1091 705/1.1 |
| 2011/0163160 A1 | 7/2011 | Zini |
| 2011/0173127 A1* | 7/2011 | Ho .......................... G06Q 10/00 705/317 |
| 2011/0218730 A1 | 9/2011 | Rider |
| 2012/0046978 A1 | 2/2012 | Cartwright |
| 2012/0150879 A1* | 6/2012 | Davis ..................... G06Q 10/06 707/754 |
| 2013/0048724 A1 | 2/2013 | Burnside et al. |
| 2013/0111488 A1 | 5/2013 | Gatti |
| 2013/0138745 A1 | 5/2013 | Tardelli et al. |
| 2013/0275187 A1* | 10/2013 | Patel .................. G06Q 10/06398 705/7.42 |
| 2013/0305081 A1 | 11/2013 | Agnihotram |
| 2014/0012615 A1* | 1/2014 | Hutchinson ............ G06Q 10/00 705/7.15 |
| 2014/0039648 A1 | 2/2014 | Boult |
| 2014/0043365 A1 | 2/2014 | Fialho |
| 2014/0046722 A1* | 2/2014 | Rosenbloom .......... G06Q 10/06 702/19 |
| 2014/0058963 A1 | 2/2014 | Martinez |
| 2014/0114717 A1 | 4/2014 | Davis |
| 2014/0136255 A1 | 5/2014 | Grabovski |
| 2014/0195290 A1* | 7/2014 | Plost ............... G06Q 10/063116 705/7.16 |
| 2014/0195295 A1* | 7/2014 | Whitley ............. G06Q 10/0633 705/7.27 |
| 2014/0207417 A1 | 7/2014 | Messinger |
| 2014/0222522 A1* | 8/2014 | Chait ................. G06Q 10/0637 705/7.36 |
| 2014/0258052 A1 | 9/2014 | Khuti |
| 2014/0258326 A1 | 9/2014 | Iyer |
| 2014/0273847 A1* | 9/2014 | Nixon .................... G05B 15/02 455/41.2 |
| 2014/0278850 A1 | 9/2014 | Boccuzzi |
| 2014/0279660 A1 | 9/2014 | Santavicca |
| 2014/0282257 A1* | 9/2014 | Nixon .................... G05B 15/02 715/835 |
| 2014/0316998 A1 | 10/2014 | Apostolides |
| 2014/0330606 A1* | 11/2014 | Paget ............... G06Q 10/06311 705/7.18 |
| 2014/0358645 A1* | 12/2014 | Ehrman ........... G06Q 10/06393 705/7.39 |
| 2015/0009013 A1 | 1/2015 | Cartwright |
| 2015/0012467 A1 | 1/2015 | Greystoke et al. |
| 2015/0081367 A1* | 3/2015 | Westlake ........ G06Q 10/063114 705/7.15 |
| 2015/0088703 A1 | 3/2015 | Yan |
| 2015/0112467 A1 | 4/2015 | McKillop |
| 2015/0120388 A1* | 4/2015 | Tan ........................ H04W 4/02 705/7.32 |
| 2015/0138354 A1 | 5/2015 | Miller |
| 2015/0199641 A1* | 7/2015 | Napoli ........... G06Q 10/063114 705/7.15 |
| 2015/0302323 A1* | 10/2015 | Connolly ........... G06Q 10/0633 705/7.27 |
| 2015/0379442 A1 | 12/2015 | Samanthapudi |
| 2016/0132821 A1 | 5/2016 | Glasgow |
| 2016/0189076 A1* | 6/2016 | Mellott ............ G06Q 10/06312 705/7.14 |
| 2016/0203429 A1 | 7/2016 | Mellott |
| 2016/0217433 A1 | 7/2016 | Walton |
| 2016/0247118 A1 | 8/2016 | Singh |
| 2016/0260046 A1* | 9/2016 | Cai ....................... G16H 40/63 |
| 2016/0300178 A1* | 10/2016 | Perry ............. G06Q 10/063112 |
| 2016/0304280 A1 | 10/2016 | Elazary |
| 2016/0306172 A1 | 10/2016 | Chestnut |
| 2016/0327941 A1 | 11/2016 | Stiernagle |
| 2016/0335731 A1* | 11/2016 | Hall ........................ G06Q 10/10 |

(56) References Cited

U.S. PATENT DOCUMENTS

| | | | |
|---|---|---|---|
| 2016/0371613 A1 | 12/2016 | Ulrich | |
| 2017/0050321 A1 | 2/2017 | Look | |
| 2017/0116552 A1* | 4/2017 | Deodhar | G06Q 10/0639 |
| 2017/0193434 A1 | 7/2017 | Shah et al. | |
| 2017/0277920 A1* | 9/2017 | DeYoung | G06Q 10/08 |
| 2018/0044112 A1* | 2/2018 | Fujiwara | B65G 1/137 |
| 2018/0150791 A1 | 5/2018 | Stansell | |
| 2018/0247264 A1 | 8/2018 | Taylor | |
| 2018/0257228 A1 | 9/2018 | Tingler | |
| 2018/0276582 A1* | 9/2018 | Qian | G06Q 10/0635 |
| 2018/0341891 A1* | 11/2018 | Setchell | G06Q 10/10 |
| 2018/0365616 A1 | 12/2018 | Taylor | |
| 2020/0104169 A1* | 4/2020 | Powell | G06F 9/485 |

FOREIGN PATENT DOCUMENTS

| | | |
|---|---|---|
| WO | WO 2014/186666 | 11/2014 |
| WO | WO 2015/161307 A1 | 10/2015 |

OTHER PUBLICATIONS

International Search Report and Written Opinion, Application No. PCT/US18/39733, mailed Sep. 13, 2018, 11 pages.
Application and File History for U.S. Appl. No. 16/013,511, filed Jun. 20, 2018, Inventor: Taylor.
Application and File History for U.S. Appl. No. 15/883,747, filed Jan. 30, 2018, Inventor: Gart.
International Search Report and Written Opinion, Application No. PCT/US18/15920, mailed Apr. 13, 2018, 7 pages.
International Search Report and Written Opinion, Application No. PCT/US18/38552, mailed Aug. 27, 2018, 8 pages.
The Warehouse Auditor, Gideon Hillman Consulting (published May 18, 2016), https://www.youtube.com/watch?v=fg8XCIfUz8E, as accessed on Jun. 10, 2019, 10 pages (with machine-generated transcript).
International Search Report and Written Opinion, Application No. PCT/US17/63613, mailed Feb. 5, 2018, 13 pages.
Trylive Retail, *Augmented Reality Sales Tools*, available at http://www.timmersion.com/node/6547, dated Nov. 9, 2016, 3 pages.
Augment, *Augment allows l'Oréal Professional to enter a new era of merchandising optimization*, available at http://www.augment.com/augmentedrealitymerchandising/, dated Nov. 10, 2016, 5 pages.
Kalista, *Mystore For Apparel and Other Consumer Goods*, dated Nov. 9, 2016, available at http://kalistaretail.co.uk/3dexperience/, 6 pages.
Essential Retail, *Tesco testing augmented reality shelf management*, dated Nov. 9, 2016, available at http://www.essentialretail.com/instoreops/article/531c566ac48b7tescotestingaugmentedrealityshelfmanagement, 4 pages.
International Search Report and Written Opinion, Application No. PCT/US2018/021697, mailed May 21, 2018, 14 pages.
Veloso et al., *Dynamic User Task Scheduling for Mobile Robots*, Association for the Advancement of Artificial Intelligence, © 2011, 6 pages.
Sun et al., *Interruptable Autonomy: Towards Dialog-Based Robot Task Management*, Intelligent Robotic Systems: Papers from the AAAI 2013 Workshop, © 2013, 6 pages.
Mcsweeney, Kelly, *Lowe's Introduces Autonomous Service Robots to Retail Stores*, ZDNet, as available at http://www.zdnet.com/article/lowesintroducesautonomousretailservicerobots/, dated Dec. 7, 2016, 4 pages.
Brewster, Signe, *Robotics Startups are Coming to the Retail Aisle*, fortune.com, as available at http://fortune.com/2015/11/11/roboticsretail/, dated Dec. 7, 2016, 5 pages.
Bourzac, Katherine, *A Robot Takes Stock: Image-Processing and Machine-Learning Algorithms Could Help Stores to Manage Inventory*, dated Jun. 29, 2012, 6 pages.
Supply Chain 247, *"Vision Picking" in the Warehouse-Augmented Reality in Logistics*, dated Nov. 9, 2016, 7 pages, as available at http://www.supplychain247.com/article/vision_picking_in_the_warehouse_augmented_reality_in_logistics.
G3 Communications, Why you need Sensor Fusion in Your 2016 Retail Analytics Strategy, 2015, https://www.slideshare.net/G3Com/why-you-need-sensor-fusion-in-your-2016-retail-analytics-strategy (Year: 2015).
Dimech, Andrew, Weight Sensing Shelves, 2015, https://www.youtube.com/watch?v=71GboW_pWWc (Year: 2015).
Newwavesensors, Smart Shelf (Short), 2011 https://www.youtube.com/watch?v=IB4QHXfDhN8 (Year: 2011).
L. Rosado, J. Gonçalves, J. Costa, D. Ribeiro and F. Soares, "Supervised learning for Out-of-Stock detection in panoramas of retail shelves," 2016 IEEE International Conference on Imaging Systems and Techniques (1ST), Chania, Greece, 2016, pp. 406-411, doi: 10.1109/IST.2016. 7738260. (Year: 2016).
Higa, Kyota, and Kata Iwamoto. "Robust estimation of product amount on store shelves from a surveillance camera for improving on-shelf availability." 2018 IEEE International Conference on Imaging Systems and Techniques (1ST). IEEE, 2018. (Year: 2018).

* cited by examiner

SYSTEMS AND METHODS FOR PERFORMING AND TRACKING ASSET INSPECTIONS

RELATED APPLICATION

The present application is a continuation of U.S. application Ser. No. 16/020,151, filed Jun. 27, 2018 and claims the benefit of U.S. Provisional Application No. 62/526,758, filed Jun. 29, 2017, which is incorporated by reference in its entirety herein.

TECHNICAL FIELD

Embodiments of the present disclosure relate generally to the field of asset management, and more particularly to systems and methods for performing and tracking asset inspections.

BACKGROUND

Various facilities conduct daily and other periodic inspections of various equipment and assets in order to comply with internal (e.g., corporate) policies and external requirements such as legal requirements in various jurisdictions. These inspections can include a diverse range of tasks across multiple assets and asset types. For example, daily inspection of a facility could include checking fire extinguishers, hoses, doors and exits, ensuring that hazardous waste storage is properly secured, testing electrical equipment, and locking or tagging out areas within the facility. These inspections can be carried out using hardcopy checklists, which are filled out manually and then stored for some time (e.g., one year) to document compliance.

Even where electronic devices have facilitated display and completion of checklists, the management of periodic inspections can be unwieldy because any given facility can include a variety of assets with a spectrum of inspection tasks and frequencies. Large organizations must manage inspection, compliance and documentation across multiple facilities in ever-changing business and regulatory environments.

Conventional approaches can be time-consuming and unduly reliant upon personnel taking due care when carrying out and documenting the inspections. Conventional approaches also require inefficient manual coordination to ensure all equipment is checked in accordance with applicable guidelines while also minimizing unnecessary inspection activities.

SUMMARY

Embodiments of the present disclosure provide methods and systems for the automation and control of periodic inspection activities.

In embodiments, a facility readiness inspection system comprises an asset database comprising an asset identification, an asset location, at least one asset inspection task definition, and an asset inspection frequency for physical assets at a facility. In embodiments, the inspection frequency of an asset can be defined by a legal requirement.

An inspection coordination application program interface (API) can be communicatively coupled with the asset database and configured to create at least one periodic inspection task list. Each periodic inspection task list can include a number of asset identifications, chosen based on the total time allotted for completion of the periodic inspection task list and the complexity of the inspection task definitions of each physical asset identified in the periodic inspection task list. Each periodic inspection task list can have a periodicity that is related at least in part to the asset inspection frequency of at least one of the of the physical assets.

In embodiments, at least one mobile electronic device can be configured to host an instance of the inspection coordination API to present a periodic inspection task list in a user interface. The user interface can be configured to present the periodic inspection task list as a series of discrete tasks and to receive task list response data in response to each discrete task.

In embodiments, an inspection analytics engine can be communicatively coupled with the inspection coordination API and the at least one mobile electronic device. The inspection analytics engine can be configured to receive the task list response data and task list completion metadata from the at least one mobile electronic device, compare the task list completion metadata with benchmark data to determine whether the periodic inspection task list was completed according to at least one internal predefined standard (such an acceptable range of time for completing the task list), and automatically produce inspection compliance documentation for each of the physical assets related to the periodic inspection task list.

In embodiments, the task list response data can include sensor data that is collected by at least one sensor of a mobile electronic device as directed by the periodic inspection task list. In embodiments, the sensors can be optical sensors, temperature sensors, pressure sensors, position sensors, and/or infrared sensors.

In embodiments, the task list completion metadata can include a time when a particular task in the periodic inspection task list was completed and/or a geolocation where a particular task in the periodic inspection task list was completed.

In embodiments, the inspection analytics engine can be further configured to automatically produce a maintenance request if the received task list response data includes a maintenance indicator.

In embodiments, the mobile electronic device can be configured to present a managerial instance of the inspection coordination API. The managerial instance can include a status dashboard of in-progress periodic inspection task lists, a visualization of task list completion metadata aggregated according to at least one factor, and/or a visualized comparison of the task list completion metadata and the benchmark data. The at least one factor can be a common user, an area, a department, a type of physical asset, a date, a time, or a period of time.

In embodiments, the inspection compliance documentation can be formatted for an internal standard or an external standard (such as a government, warranty or other external standard).

In embodiments, the task list completion metadata can be compared with benchmark data to determine whether an individual task in the periodic inspection task list was completed according to at least one internal predefined task standard, such as an acceptable range of time for completing the individual task.

In embodiments, the relative locations of the physical assets in the facility can be considered in the creation of each periodic inspection task list.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

Figure 1:
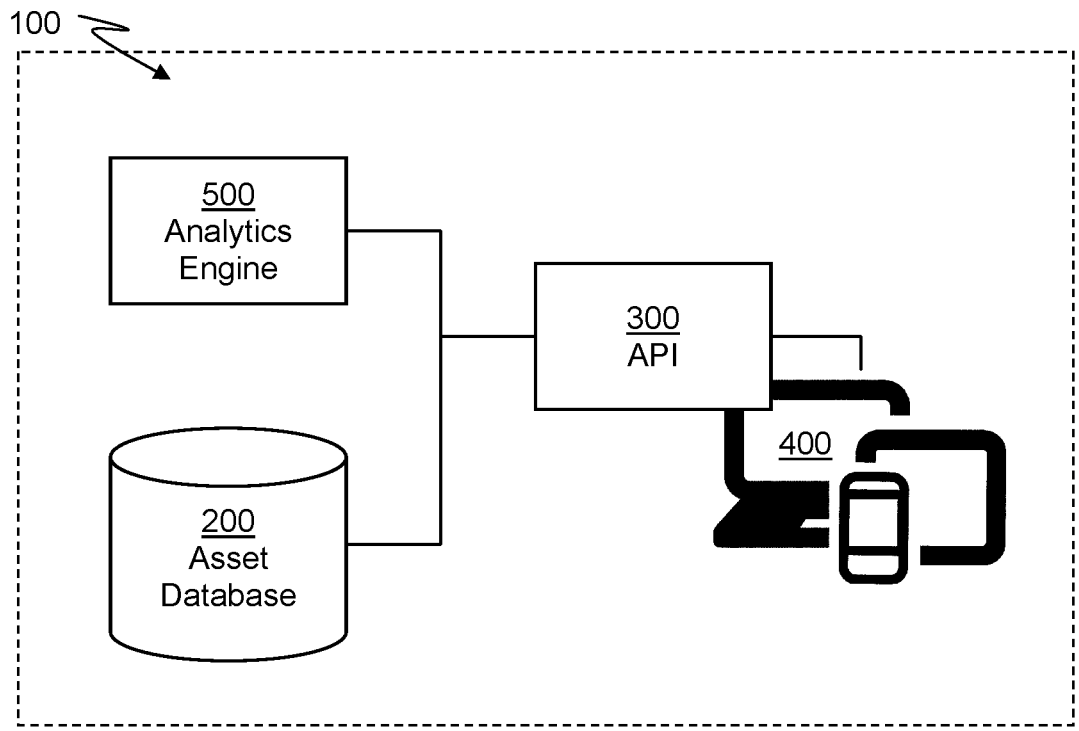
FIG. 1 is a block diagram depicting components of a facility readiness inspection system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments relate to a facility readiness inspection system 100 for coordinating and facilitating daily readiness and other facility inspections. FIG. 1 is a block diagram depicting a schematic view of the architecture of system 100 according to an embodiment. System 100 can comprise an asset database 200, an application program interface (API) 300, one or more mobile electronic devices (or "mobile devices") 400, and an analytics engine 500.

The various components and engines of facility readiness inspection system 100 can reside on, or be executed by, a single computing device, such as a mobile device 400 in embodiments. In other embodiments, each of the components and engines of facility readiness inspection system 100 can reside on, or be executed by, a plurality of computing devices in continuous or intermittent data communication with each other.

Figure 2:
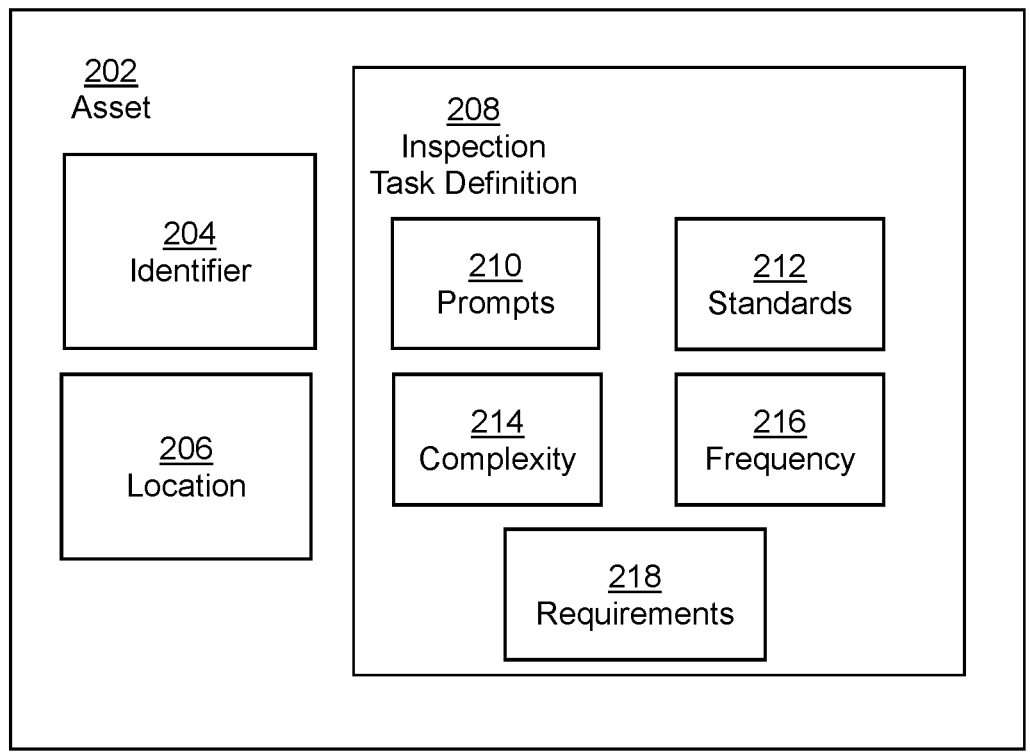
FIG. 2 is a block diagram depicting data structures of an asset database, according to an embodiment.

Asset database 200 can store data representing assets and information related to required inspections. Asset database 200 can be provided exclusively for inspection use, or can comprise data residing within an enterprise resource planning (ERP) system, or other system wherein an organization might define what must be checked, and how often. Assets can include equipment, material, vehicles, computing systems, personnel, or any other object or thing. FIG. 2 is a block diagram depicting data elements for records related to internal or external assets 202 that can be stored in asset database 200. Asset 202 can comprise an identifier 204, a location 206, and one or more inspection task definitions 208. Each inspection task definition 208 can comprise an inspection task complexity 210 and inspection task frequency 212. Each asset 202 can have a different number of inspection task definitions 208, depending on the inspection requirements for the asset. For example, a freezer might need to have its temperature verified at least daily, but a coolant level might only required yearly checking. In embodiments, task definitions 208 can comprise a static due date instead of, or in addition to, frequency 216, enabling tasks to be scheduled for certain known dates.

Identifier 204 can comprise an asset number which can be based on an internal asset number or other identifier. In embodiments, each physical asset 202 can be labeled based on identifier 204. Such labels can comprise bar codes, quick response (QR) codes, radio frequency identification (RFID) tags, or other identifiers or combinations of identifiers. In some embodiments, the asset identifier can be machine-readable.

Location 206 can describe the location of an asset 202. Location 206 can be associated with a physical location such as a slot, area, shelf, retail section, department, aisle, store site, warehouse site, distribution center, or other location where an asset to be inspection might be present.

Inspection task definition 208 can define the steps that are to be taken to complete an inspection of an asset. For example, inspection of a freezer unit might include verifying that the door is closed, checking whether the freezer is in need of defrosting, and logging the internal temperature. Task definition 208 can comprise inspection checklists (for example, a list of points or features to check to complete an inspection of any particular asset). Task definition 208 can comprise prompts 210 for receiving user input. Prompts 210 can include text as well as pictures of other indications of what the physical asset should look like or a condition in which the asset or part of the asset should be found, in order to assist in locating the asset and/or to provide a reference for comparison. In embodiments, task definition 208 can comprise internal or external standards 212 for the asset. External standards can include governmental compliance requirements (for example, a freezer must maintain a temperature of zero degrees Fahrenheit). Internal standards can be based on or exceed external standards (for example, all freezers must maintain a temperature of −10 degrees Fahrenheit).

Task definition 208 can further comprise requirements 218 for task performance. In embodiments, requirements 218 can comprise qualifications (such as training, certification, or other skills) necessary to perform the task. For example, certain inspection tasks might need to be performed by a licensed electrician, or an associate might need to have completed internal training on facility HVAC systems in order to perform inspections on HVAC assets. In some facilities, hazardous material handling certification might be required in order to inspect a materials holding cage.

Inspection task complexity 214 can indicate a relative complexity of inspection for asset 202. In embodiments, complexity 214 can comprise an expected completion time or range of time. In other embodiments, complexity 214 can represent the number of steps required to complete an inspection task for asset 202. Other parameters, or combinations of parameters, can be used to evaluate complexity in embodiments.

Inspection task frequency 216 can indicate how often the inspection needs to be performed. For example, the freezer unit discussed above might require inspection a certain number of times per day. As another example, a fire extinguisher might need to be inspected monthly, or quarterly. In embodiments, frequencies 216 can be defined by legal requirements.

Figure 3:
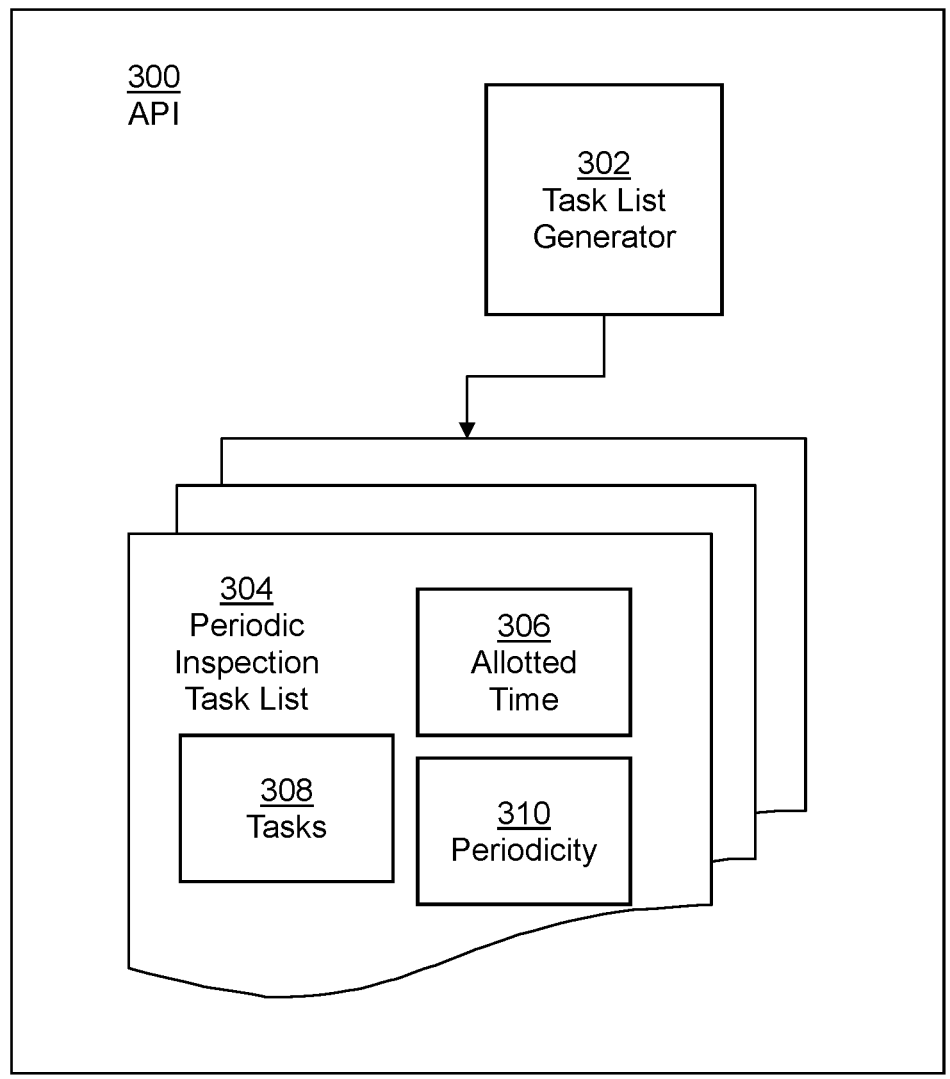
FIG. 3 is a block diagram depicting a schematic view of an API, according to an embodiment.

FIG. 3 is a block diagram depicting components and engines of an inspection coordination application program interface (API) 300, which can be communicatively coupled to asset database 200. In embodiments, all or portions of API 200 can reside or be executed on each of the one or more mobile devices 400.

Task list generator 302 can be configured to generate one or more periodic inspection task lists 304 based on asset database 202. Task list generator 302 can generate the task lists 304 based on received parameters such as an allotted time 306 in which the task list must be completable, or a specific facility to be inspected. Each periodic task list 304 can comprise a list of tasks 308 (each having an associated task definition 208 and asset 202) and a periodicity 310 indicating the frequency at which the task list 304 should be performed.

The list of tasks 308 can be determined based on the allotted time 306 and the complexity 214 of each identified. For example, if only fifteen minutes are allotted for completion of a task list 304, task list generator 302 can select thirty assets to inspect with a complexity 210 indicating that inspection will take about thirty seconds, or three assets if the expected inspection time is about five minutes, or various combinations thereof. In some embodiments, task list 304 can include any number of tasks, and the allotted time 306 can be calculated based on the total expected time of the tasks.

Periodicity 310 of task list 304 can be determined based on the frequency 216 associated with each task 208. For example, a task list 304 including tasks 208 that must be performed at least twice a year can have a periodicity 310 of six months.

In embodiments, task list generator 302 can randomize the tasks 308 that are inspected on any day or period, or by any inspector, while also coordinating asset inspection with requirements. For example, if a facility has hundreds of fire extinguishers that each need to be inspected monthly, task list generator 302 can create task lists 304 such that each fire extinguisher is checked at least monthly. This can avoid situations where certain assets are inspected multiple times while others are not checked in any given month. In embodiments, task list generator 302 can plan and coordinate inspections, including audits conducted by multiple inspections and/or over time.

In embodiments, task list generator 302 can use geolocation or other information and systems to efficiently group assets into task lists. For example, each task list 304 can focus on the assets 202 in a particular quadrant of a facility in order to minimize the area that must be traversed between assets to inspect.

Figure 4:
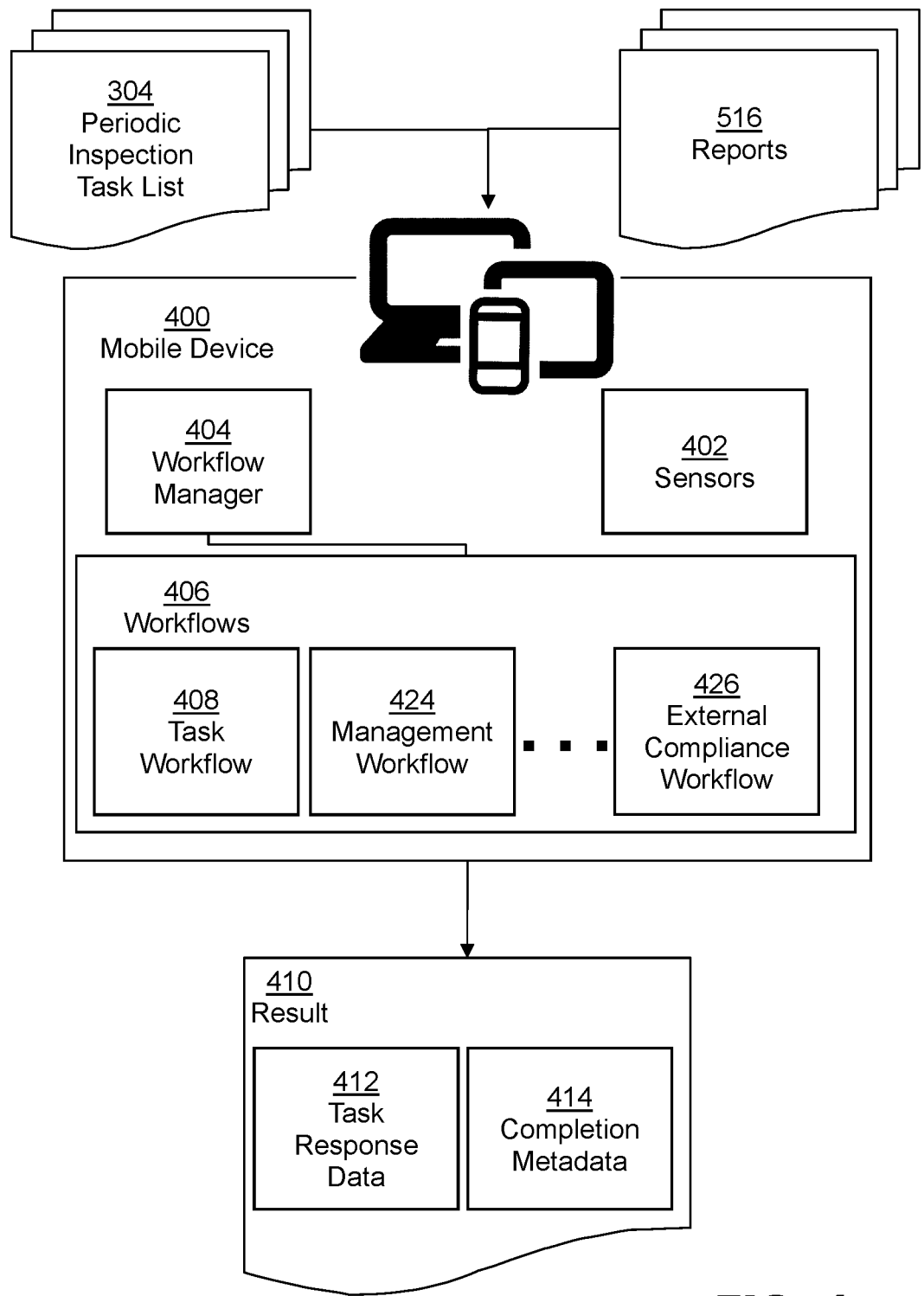
FIG. 4 is a block diagram depicting a schematic view of components of a mobile device, according to an embodiment.

Turning now to FIG. 4, mobile devices 400 are configured for use to perform inspections and review inspection results. Mobile devices 400 can be any computing devices capable of presenting tasks and receiving responses in a variety of locations. In embodiments, each mobile device 400 can be a smartphone, a tablet computer, or a mobile retail computer device such as an MC40 or TC70 as manufactured by Motorola. In other embodiments, each mobile device 400 can be an interface for programmatic communication with an autonomous device, such as a drone or robot. Users, therefore, can be human users such as employees, contractors, or other associates, or programmatic users, such as autonomous devices.

Each mobile device 400 can further comprise one or more data communication interfaces enabling mobile devices 400 to communication with other components of system 100 as required. Data communication interfaces can include wired connections such as Ethernet connections, Universal Serial Bus (USB), and the like; wireless connections such as WiFi, Bluetooth, Zwave, ZigBee, I2C, and the like; and/or other communication interfaces or protocols enabling data communication between mobile devices 400 and other components of system 100.

In embodiments, each mobile device 400 can comprise one or more sensors 402 enabling the mobile device 400 to actively or passively detect data regarding the surrounding environment. Data can be requested from the sensors 402 the current task list 304 or on a regular or random basis regardless of the task being performed. Sensors 402 can comprise optical sensors (such as cameras), temperature sensors, pressure sensors, position sensors, infrared sensors, microphones, moisture sensors, and/or some other sensor capable of sensing and returning data to mobile device 400.

In embodiments, sensors 402 can comprise components for reading and/or decoding tag information on physical assets to determine the asset identifier 204 represented by the tag. Such components can include barcode scanners, cameras, radio frequency identification (RFID) transponders, and the like. This can improve efficiency and accuracy as the user does not have to manually enter the asset identifier.

In embodiments, sensors 402 can comprise a location monitor to monitor the location of the mobile device 400. This monitoring can assist in ensuring that the user is performing the inspections at the correct location 206 for an asset 202. Location monitoring can also enable automatic identification of an asset based on the current location of mobile device 400. In embodiments, the current location of mobile device 400 can be correlated with the known or expected location of an asset 202 based on the current task list 304. Mobile device 400 can then prompt the user to confirm the identification of the asset. The location can be determined in real time (or near-real time) by locating the user, or the mobile device 300 associated with the user. Location sensors can operate via geolocation, Wi-Fi or other wireless triangulation, dead reckoning, or other locating techniques as are known in the art. The determined location can also be used to efficiently route the user to the next asset to be inspected.

Each mobile device 400 can be independent of other mobile devices 400, such that multiple users can separately access and interact with system 100. Each mobile device 400 can comprise one or more output interfaces (such as a screen, audio output, or haptic output), and one or more input interfaces (such as a touch screen, keyboard, mouse, or microphone). The output and input interfaces can be used to present one or more workflows 404 to the current user. Each workflow 404 can enable the user to perform actions such as executing tasks of a task list 304, or viewing raw data or reports 510 (as generated by analytics engine 500, discussed with reference to FIG. 6 below.

Workflow manager 406 can present a set of workflows 404 based on characteristics of the current user. The workflow options presented to a user can be limited by the user's access level, role, location, and/or the requirements 218 of any remaining task definitions. For example, user roles can include manager, maintenance, asset protection, quality assurance, external audit, or the like.

Task workflow 408 can present the various tasks 308 of a received task list 304 as discrete tasks for the user to perform and request user input to populate a result 410 record. Result 410 can comprise task response data 412, and completion metadata 414, which can include data regarding the task start time and end time and/or the geolocation of where the task was completed. In some embodiments, these features can be interactive, enabling associates to tap or select them on the mobile device to get more information.

Figure 5A:
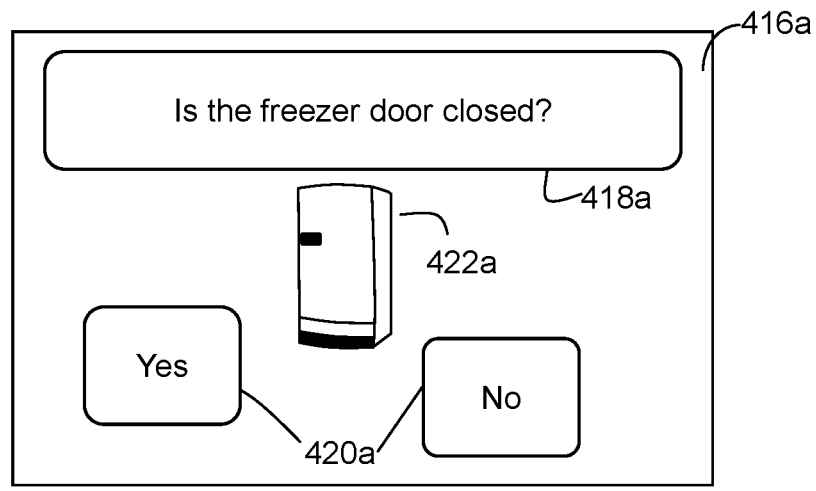
FIG. 5A is a layout depicting a user input screen, according to an embodiment.
Figure 5B:
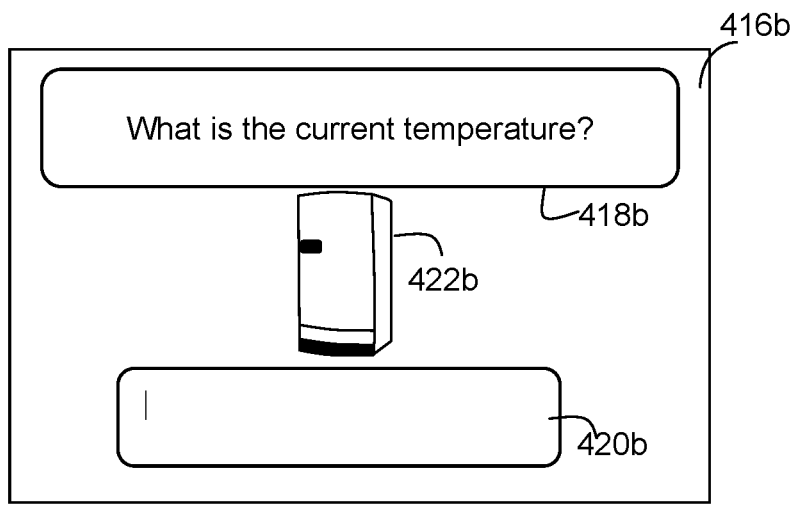
FIG. 5B is a layout depicting a user input screen, according to an embodiment.

Task input screens 416 can be dynamically generated based on tasks 308. FIGS. 5A and 5B depict are example layouts of input screens 416.

FIG. 5A depicts an embodiment of a screen 416a that can be presented for manual input by a user. Screen 416a includes a prompt 418a, and an input area 420a. In embodiments, a visual 422a providing an indication to the user of what to look for may be provided. Prompt 418a can ask "Is [item] in [state]?" Input area 420a can present "Yes" or "No" input options.

FIG. 5B depicts an embodiment of a screen 416b that may be presented for manual input of a current condition. Prompt 418b asks the user "What is the current temperature?" Input area 420b can present a text field for entry via an on screen or physical keyboard, or other mechanism for numerical input.

Input areas 420 can include input validation by workflows 404. Input validation can ensure that numeric entry fields contain only positive integer values, for example. Other input validation techniques known in the art can be used to inhibit data entry errors. In addition, task input screens can include information regarding the previous user to perform the task and the previous results, where desired.

In embodiments, task workflow 408 can enable the user to manually report that an asset 202 is in need of repair or maintenance. Data from sensors 402 (such as photographs taken with a camera) can also be used for documenting inspection information. For example, if a problem is discovered during the inspection and repair is needed, the user can photograph the issue needing repair.

In embodiments, task workflow 408 can dynamically re-order the tasks 308 to guide the user from asset to asset, using a map or other guidance for smart routing. This can be more efficient than presenting the entire list to the associate and hoping that the associate finds an efficient path that covers all of the assets. This also enables task workflow 408 to adjust plans on the fly. For example, in a situation in which an asset needs to be re-inspected or checked by a second person, a nearby user can be quickly dispatched to that asset.

In embodiments, task workflow 408 can enable the user to perform ad hoc inspections of assets 202 that are near the user's present location but not included in task list 304. Task workflow 408 can present a screen requesting the identification of an asset, and present the tasks 308 of a task list 304 generated based on the inspection task definitions 208 of the identified asset 202.

Figure 5C:
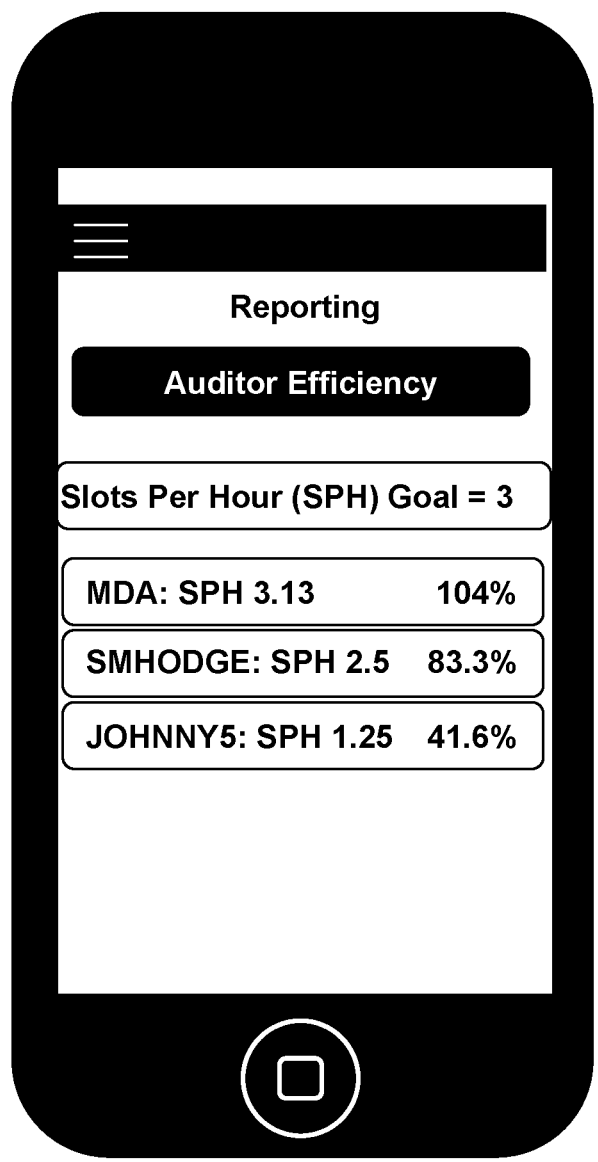
FIG. 5C is a layout depicting a reporting screen, according to an embodiment.

Management workflow 424 can present user interface elements enabling management users to review individual or aggregate results 410, or reports 510 generated by report generator 512 as discussed with respect to FIG. 6 below. The user interface elements can include a status dashboard of in-progress periodic inspection task lists, a visualization of task list completion metadata, and/or a visualized comparison of the task list completion metadata and benchmark data. Each visualization can be aggregated based on common factors, such as users, areas, departments, asset types, dates, times, or periods of time. Management workflow 424 can further provide real-time tracking of associates conducting inspections and assets, for example by providing "heat maps" of associates, issues and/or assets based on location and activity. Management workflow 424 can further provide user interface features facilitating identification of issues and links to systems for initiating mitigation or remediation processes. FIG. 5C is depicts an example screenshot of an efficiency report, according to an embodiment.

Additional workflows can also be provided, in embodiments. For example, external compliance workflows 426 can be similar to management workflows comprising limited viewing access such that the user can view only specific reports. External compliance workflows 426 can enable government or other auditors to verify compliance and to monitor any necessary corrective action, without disclosing proprietary information.

Figure 6:
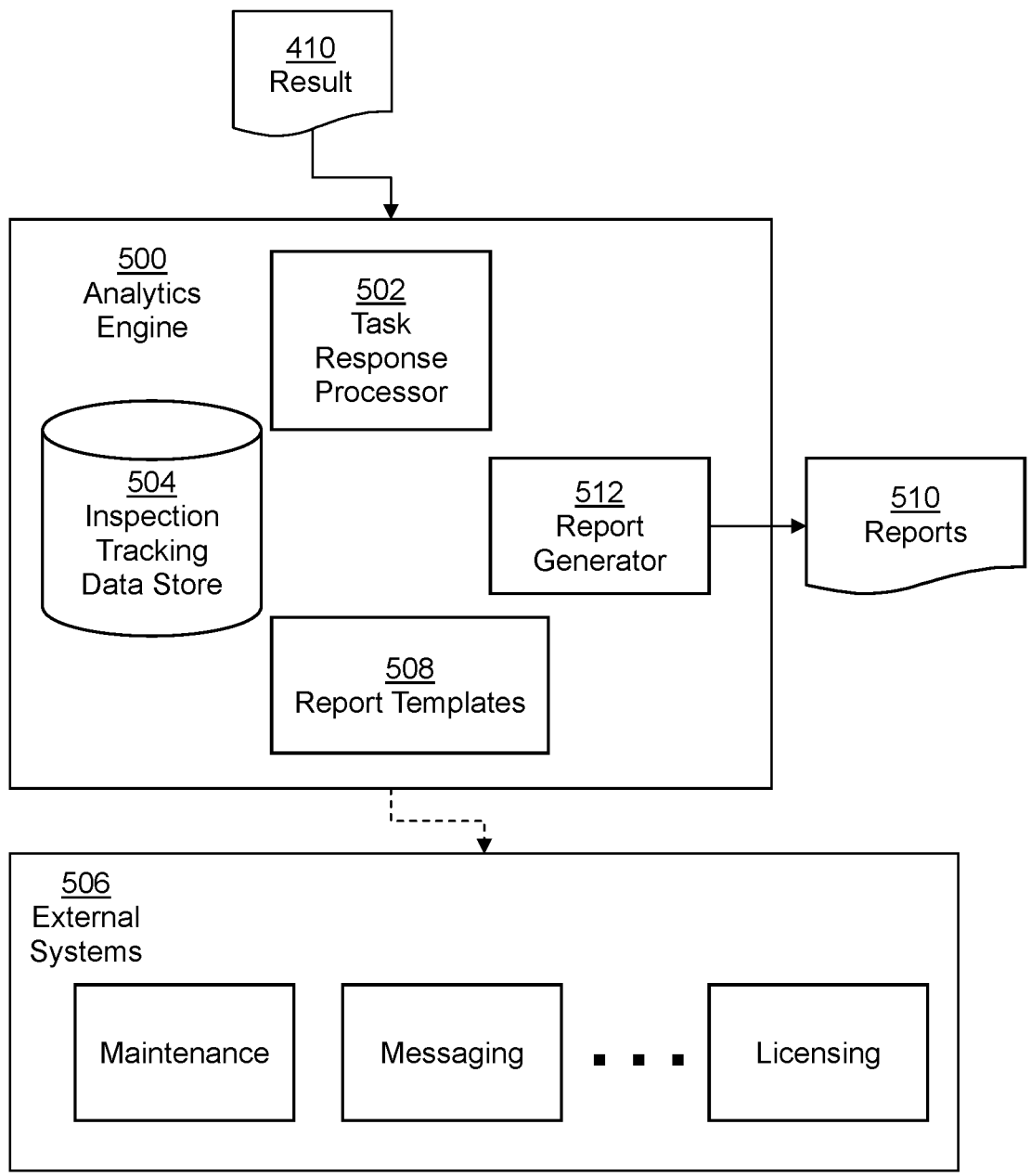
FIG. 6 is a block diagram depicting a schematic view of an analytics engine, according to an embodiment.

Turning now to FIG. 6, analytics engine 500 is configured to receive and process results 410 from mobile devices 400. A task response processor 502 of analytics engine 500 can receive each result 410 for storage in an inspection tracking data store 504 for use as benchmark data. In addition, task response processor 502 can perform additional activities based on task response data 412 and completion metadata 414. For example, task response processor 502 can be in data communication with one or more external business systems 520 such as a maintenance system, messaging system, human resources system, licensing system, autonomous device co-ordination system, and the like, such that alerts, requests, messages, or other data can be generated and sent to business systems 520 as indicated by each result 410.

Analytics engine 500 can further comprise one or more report templates 508 defining the data and display format of reports 510 that can be produced by report generator 512. Report generator 512 can aggregate the results 410 stored in inspection tracking data store 504 based on report templates 508 to produce tailored reports for varying purposes. In embodiments, reports can be produced for display on mobile devices 400, saved in one or more databases, or saved in a data format such as a spreadsheet, portable document format (PDF), word processing document, or other formats as desired. In embodiments, reports can include photos taken by the mobile device 400 during the inspection, which can speed understanding and appreciation of issues. Reports can include data grouped by user, asset, location, or other groupings as defined by report templates 508.

Internal reports can be prepared to identify opportunities for improvement and to manage repeat problems identified in or by the inspections (for example, repeated problems found with a particular brand of asset in a facility or across an organization could lead to a warranty claim or replacement decision). External reports can be prepared to meet compliance requirements such as those dictated by government agencies responsible for monitoring compliance, such as OSHA, the FDA, EPA, and the like).

Report generator 512 also can determine efficiency metrics that can be reported to administrators and managers. For example, a report 510 can track how long a user is at a particular location, how long it takes a user to move between locations, total inspection time, and other time- and/or location-based metrics. From this data, analytics engine 500 can determine how long an average user takes to carry out inspection-related tasks and compare times to detect problems or inefficiencies.

In some embodiments, analytics engine 500 can determine benchmarks (for example, that a particular task should take 10 minutes, a certain set of tasks should take three hours, or that a certain number of locations should be completed in one hour). These benchmarks can be incorporated into internal standards 212 for each task definition. In embodiments, analytics engine 500 can determine and flag situations in which the user is completing tasks significantly slower or faster than average (or faster than is possible according to the task's location or complexity). Slow times can indicate performance issues to be mitigated. Fast times can indicate that tasks are not being thoroughly completed. In embodiments, tasks that are completed faster than a threshold time can be automatically scheduled to be repeated by another user.

These metrics and scores can be applicable to individual users, teams of users, users at a particular location, or other groupings of users. The data can enable system 100, managers, and administrators to carry out a variety of different comparisons in order to measure and improve the efficiency of inspection operations. The data also can assist with planning and scheduling of personnel, such as how many inspectors should be scheduled to perform particular inspection tasks on one day (or in some other time period). Conversely, the data can also be used to design and/or plan inspection tasks based on how many inspectors are expected to be available at a particular time (based on scheduling information in a human resources system, for example).

Because report information and form can vary according to its purpose, timeframe, audience, or some other factor, report generator 512 can produce and provide information that enables managers and administrators to check and evaluate metrics of efficiency. These reporting features can improve liability management and compliance with external requirements, as well as enabling efficient recognition of problems.

Because the system can be implemented across an organization with many locations and assets, the system can identify issues across the organization. This can enable faster issue spotting and more comprehensive asset management within the organization via trend detection or other methods. For example, a common issue among facilities in a particular region could lead the system to identify a common vendor, and one follow-up with the vendor regarding all the issues (rather than each facility attempting to work individually with the vendor) may speed resolution and lead to a more efficient and effective result for the organization.

Trends can be used enable asset managers to proactively avoid potential problems. For example, if a high failure rate is detected for fire extinguishers manufactured in May 2015, the organization can choose to replace all of the fire extinguishers manufactured during that period, as opposed to waiting for future failures. Without the narrower information provided by the system, such proactive action might be prohibitively expensive and wasteful (for example, it may be too costly to replace all fire extinguishers). In embodiments, external system 506 can comprise a licensing database. The licensing database can store and track personnel, asset, facility and other licensing information. For example, facility personnel may require special licensing or certification to work with or manage power equipment. Analytics engine 500 system can track and periodically check personnel readiness and licensure to ensure compliance. As an example, a task definition 208 for an asset requiring special licensing can include scanning the employee badges of personnel currently interacting with the asset 202, enabling quick and convenient verification.

In operation, each mobile device 400 can enable the user of the mobile device to present information identifying the user. Identifying information can include names, user names, passwords, PINs, optical or other scan input, fingerprint input, or any other identifying and/or authenticating information. Mobile device 400 can then enable the user to select a workflow 402 from a list of currently selectable workflows for the current user.

Figure 7:
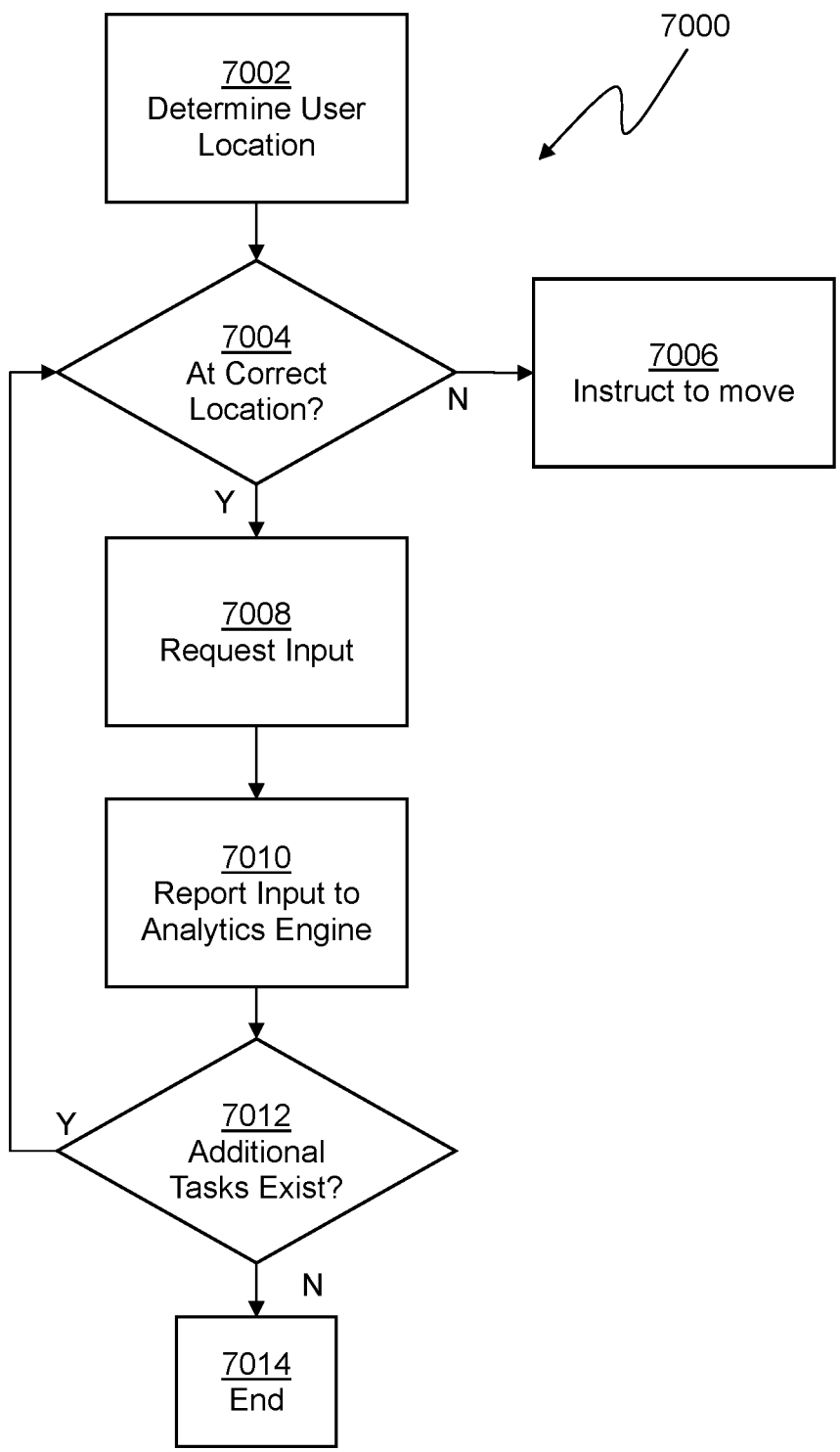
FIG. 7 is a flowchart depicting a method for performing an inspection, according to an embodiment.

Upon user selection of task workflow 408, each mobile device 400 can guide the user to perform the various activities of method 7000, depicted in FIG. 7, in order to complete the tasks of a task list 304.

At 7002, the location of the user can be determined. In embodiments, the location can be confirmed by requesting that the user scan a location identification tag or perform some other locating task. At 7004, if the user is not in the correct location, the user is instructed to move to the appropriate location at 7006. The location can be redetermined at 7002.

At 7008, task workflow 408 can present a task 308 from task list 304. In embodiments, task list 304 can be pre-filtered based on the current user in order to ensure that the current user meets the requirements 218 of the task definition. User qualifications can be provided to mobile device 400 by the user, or can be retrieved from a human resources system, or other business system 520. The requested task input can vary based on the prompt 210 and other information associated with inspection task definition 208.

After input is received it can be provided to analytics engine 500 at 7010. At 7012, the task 308 can be consulted to determine if additional tasks exist, and if so execution can return to 7004 where the current location can be checked before the next task is completed. In embodiments, updates to task list 304 can be retrieved at any time (such as after performance of a task is complete), enabling more dynamic assignment of tasks to users.

Figure 8:
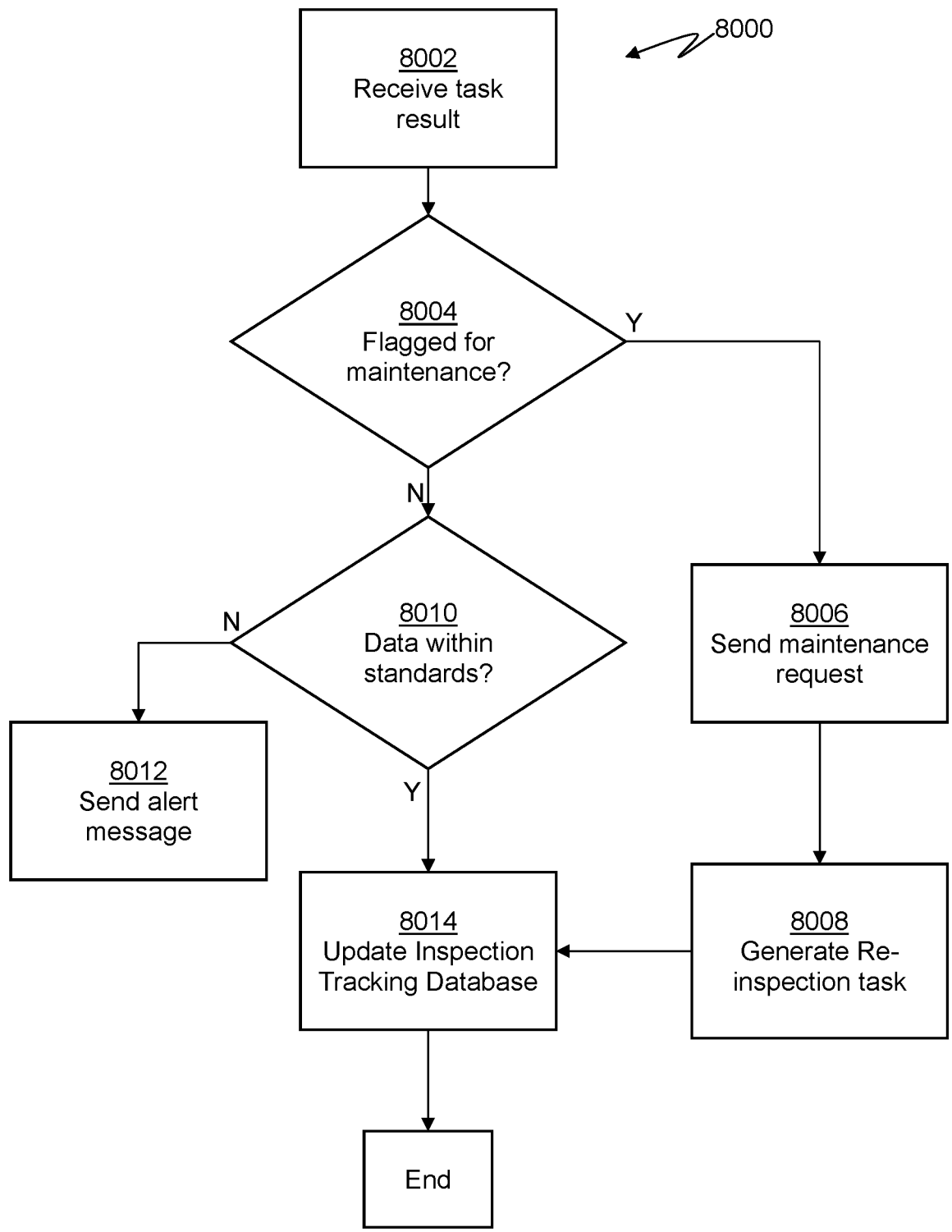
FIG. 8 is a flowchart depicting a method for processing a task response, according to an embodiment.

FIG. 8 is a flowchart depicting a method 8000 for processing a task result 410 upon receipt of input mobile device 400. At 8002, the result is received (for example, as the output from 7010 of method 7000, discussed above. The task response data 412 and completion metadata 414 can then be evaluated.

If, at 8004, the task response data 412 includes an indication that maintenance is required, a maintenance request can be sent at 8006, and at 8008 a re-inspection task can be added to the asset database 200 for the asset 202.

At 8010, the task response data 412 and the completion metadata 414 can be checked based on the task standards 212 and benchmark data contained in inspection tracking data store 504 to determine that the result 410 is within the required standards. If not, an alert or other escalation can be generated at 8012. In embodiments, an alert can be directly communicated to external systems 506 as dictated by business rules in order to initiate mitigation or logging processes. At 8014 the inspection tracking data store 504 can be updated.

Figure 9:
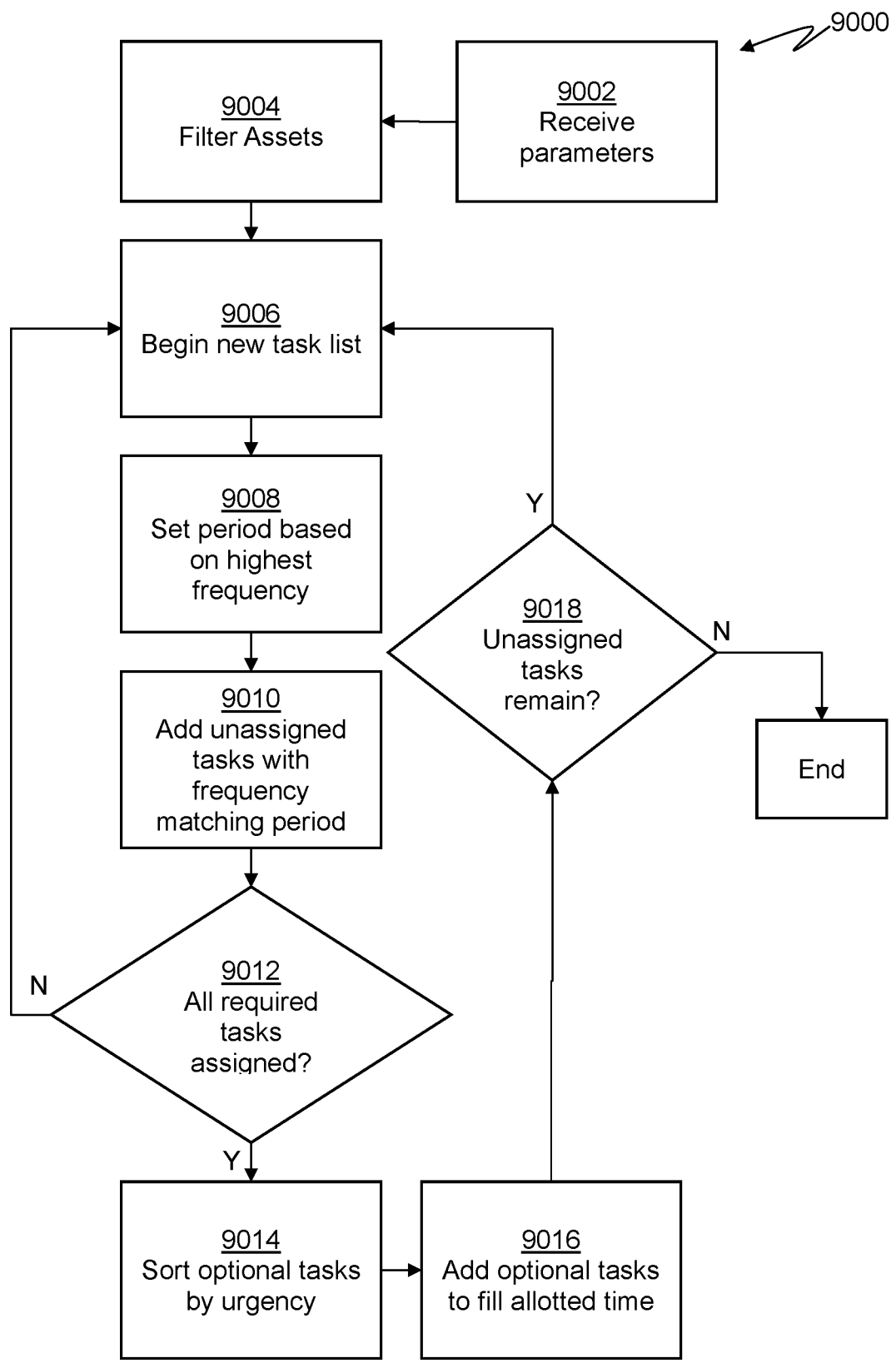
FIG. 9 is a flowchart depicting a method generating a task list, according to an embodiment.

FIG. 9 is a flowchart depicting a method 9000 for generating periodic task lists 304, according to an embodiment. At 9002, parameters such as the allotted time and/or the geolocation of the facility to be inspected can be received. At 9004, the asset database 200 can be queried to receive the list of assets 202 (and associated task definitions 208) that match the provided parameters.

At 9006, a new task list 304 can be created. Any unassigned task definitions 208 can be reviewed to determine the highest frequency 216 of the remaining task definitions. At 9008, the periodicity 310 of the task list 304 can be set based on that frequency. Task definitions 208 with a matching frequency (for example, daily) can be considered to define required tasks, and task definitions 208 with longer frequencies (for example, monthly) can be considered to define optional tasks for the present round. At 9010, the required tasks can be added to the task list 304 until the total complexity 210 of the tasks reaches the allotted time, or no required tasks remain as task definitions 208 are added to task list 304, they can be treated as assigned. At 9012, if required tasks remain, a new task list 304 can be created at 9006 and a new round can begin.

If at 9012 all of the required tasks have been assigned, optional tasks can be added in order of urgency. Optional tasks will have a lower frequency than the period of the current task list 304. Urgency can be determined based on the time before the next inspection is needed, based on the task frequency and inspection history (for example, if the current date is June 1 a yearly task with a due date of June 2 can have a higher urgency than a monthly task with a due date of June 15). At 9014, the optional tasks can be sorted by urgency, and at 9016, the optional tasks can be added to task list 304 in order of urgency until the allotted time is reached.

If, at 9018, no tasks remain, execution can end. If tasks remain to be assigned, a new task list 304 can be created at 9006 and a new round can begin. By this method, every task definition 208 can be added to a periodic task list 304, though other methods of generating periodic task lists 304 can be used by embodiments.

While conventional methods of assigning and reviewing inspection tasks require manual steps by managers and/or inspectors, the systems and methods of the present disclosure provide specific technology that enables the automation of task assignment and review.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring device allows remote transmission, secondary utilization of controllers secures data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI includes a source of substantially all continuously-utilized near term data. However, KRI may be discarded depending upon the degree to which such KM has any value based on local processing and evaluation of such KRI. In an exemplary embodiment, KM may not even be utilized in any form if it is determined that KRI is transient and may be considered as signal noise.

Furthermore, in an exemplary embodiment, the kernel can reject generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data. In a further exemplary embodiment, the kernel can filter out noisy data ("KRN"). In an exemplary embodiment, KRN, like KRI, includes substantially a continuously utilized near term source of data, but KRN may be retained in order to provide a predictive model of noisy data.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A facility readiness inspection system comprising:
    an inspection coordination application program interface (API) configured to create a periodic inspection task list including a plurality of discrete tasks each having a task definition and an associated asset;
    a plurality of mobile devices each communicatively coupled to the inspection coordination API to present the periodic inspection task list in a user interface of the mobile device, each user interface configured to:
        upon detecting a location of the mobile device by a workflow manager implemented on the mobile device of the user interface, dynamically reorder the plurality of discrete tasks based on the location of the mobile device and present a smart routing guidance to guide a user between the dynamically reordered plurality of discrete tasks on the fly in an efficient path;
        upon detecting, by the workflow manager, that the location of the mobile device corresponds with the location for performing a discrete task, present the discrete task via the user interface, wherein the discrete task is determined based on user characteristics obtained by the workflow manager, the task definition of the discrete task, and the location of the mobile device; and
        receive task list response data and task list completion metadata; and
    an inspection analytics engine communicatively coupled with each of the plurality of mobile devices, the inspection analytics engine configured to, for each mobile device:
        receive the task list response data and the task list completion metadata;
        determine a benchmark based on the user characteristics, task definition of the discrete task, and the location of the mobile device;
        compare the task list completion metadata with benchmark data associated with the benchmark to determine whether the periodic inspection task list was completed according to the benchmark;
        in response to determining that the discrete task was completed according to the benchmark, update the benchmark data with the task list completion metadata; and
        in response to determining that the discrete task was not completed according to the benchmark, send, by the workflow manager, the discrete task to another of the plurality of mobile devices near the location for performing the discrete task for a user of the other mobile device to repeat the discrete task.

2. The system of claim 1, wherein the inspection analytics engine is further configured to, in response to determining that the discrete task was not completed according to the benchmark, add a new task to the periodic inspection task list.

3. The system of claim 2, wherein the new task has a task definition that indicates the associated asset must be re-inspected.

4. The system of claim 1, wherein:
the user characteristics include user qualifications retrieved from a human resources system; and
a number of the plurality of discrete tasks included on the periodic inspection task list is determined based on a complexity value of each task and a total allotted time for completing the plurality of discrete tasks.

5. The system of claim 4, wherein the user qualifications include an access level or a role associated with the user.

6. The system of claim 1, wherein the inspection analytics engine is further configured to generate inspection compliance documentation.

7. The system of claim 6, wherein the inspection compliance documentation includes an alert based on the benchmark.

8. The system of claim 1, wherein each mobile device is configured to display a task input screen via the user interface of the mobile device, wherein the task input screen is dynamically generated based on the discrete task and the user characteristics.

9. The system of claim 1, wherein at least one of the mobile devices is configured to present a managerial instance of the inspection coordination API, the managerial instance comprising at least one of a status dashboard of the periodic inspection task list, a visualization of the task list completion metadata aggregated according to at least one factor, or a visualized comparison of the task list completion metadata and the benchmark data.

10. The system of claim 9, wherein the at least one factor is a common user, an area, a department, a type of physical asset, a date, a time, or a period of time.

11. The system of claim 1, wherein the benchmark is an acceptable range of time for completing the discrete task.

12. The system of claim 1, wherein the inspection coordination API is configured to consider relative asset locations of the associated assets to create the periodic inspection task list.

13. A method of managing facility readiness inspections comprising:
building, by an inspection coordination application program interface (API), a periodic inspection task list including a plurality of tasks each having a task definition and an associated asset for inspection in a facility and:
determining a location of a mobile device of a plurality of mobile devices by a workflow manager implemented on the mobile device, each of the plurality of mobile devices communicatively coupled with the inspection coordination API to present the periodic inspection task list via a user interface of the mobile device;
upon detecting the location of the mobile device, dynamically reordering the plurality of tasks based on the location of the mobile device and presenting a smart routing guidance to guide a user between the dynamically reordered plurality of tasks on the fly in an efficient path;
upon detecting that the location of the mobile device corresponds with a location for performing a task of the plurality of tasks, presenting the task via the user interface, wherein the task is determined based on user characteristics associated with a current user of the mobile device obtained by the workflow manager, the location of the mobile device, and the task definition;
receiving task list response data and task list completion metadata in response to the task;
determining a benchmark based on the user characteristics, task definition of the task, and the location of the mobile device;
comparing the task list completion metadata with benchmark data associated with the benchmark to determine whether the periodic inspection task list was completed according to the benchmark;
in response to determining that the task was completed according to the benchmark, updating the benchmark data with the task list completion metadata; and
in response to determining that the task was not completed according to the benchmark, sending, by the workflow manager, the task to another of the plurality of mobile devices near the location for performing the task for a user of the other mobile device to repeat the task.

14. The method of claim 13, further comprising, in response to determining that the task was not completed according to the benchmark, adding a new task to the periodic inspection task list.

15. The method of claim 14, wherein the new task has a task definition that indicates the associated asset must be re-inspected.

16. The method of claim 13, wherein the user characteristics include user qualifications retrieved from a human resources system.

17. The method of claim 16, wherein the user qualifications include an access level or a role associated with the current user.

18. The method of claim 13, further comprising dynamically presenting a managerial instance of the inspection coordination API, the managerial instance comprising at least one of a status dashboard of in-progress periodic inspection task lists, a visualization of the task list completion metadata aggregated according to at least one factor, or a visualized comparison of the task list completion metadata and the benchmark data.

19. The method of claim 18, wherein the at least one factor is a common user, an area, a department, a type of physical asset, a date, a time, or a period of time.

20. A non-transitory computer readable storage medium comprising instructions that when executed on at least one processor cause the at least one processor to implement the method of claim 13.

* * * * *